United States Patent [19]
Bull et al.

[11] 4,126,375
[45] Nov. 21, 1978

[54] LENS SHIELD MEANS

[75] Inventors: David W. Bull, Hersey; Norman A. Rautiola, Reed City, both of Mich.

[73] Assignee: Nartron Corporation, Reed City, Mich.

[21] Appl. No.: 788,439

[22] Filed: Apr. 18, 1977

[51] Int. Cl.² ............................................. G02B 7/02
[52] U.S. Cl. ...................................... 350/58; 362/456
[58] Field of Search .................. 350/57, 58, 319, 242, 350/276 R; 362/455, 456, 369, 376, 377, 378, 390

[56] References Cited

U.S. PATENT DOCUMENTS

| 2,381,101 | 8/1945 | Bausch | 350/57 |
| 2,919,622 | 1/1960 | Hensoldt | 350/57 |

Primary Examiner—Jon W. Henry
Attorney, Agent, or Firm—Lon H. Romanski

[57] ABSTRACT

In one aspect of the invention a detachable lens shield is formed of relatively resiliently deflectable material and made in a generally tubular configuration with an internally formed textured-like surface for enhancing the gripping action thereof onto a coating lens.

17 Claims, 17 Drawing Figures

LENS SHIELD MEANS

BACKGROUND OF THE INVENTION

Generally, in the automotive field, especially with regard to trucks, indicator lamp assemblies are employed as to indicate, as by their respective energization, that, for example, certain selected functions or vehicular operating parameters are in an unacceptable condition. For example, as in a truck, such indicator lamp assemblies may be operatively connected to related sender units which are, in turn, responsive to indicia of engine oil level, engine temperature, loss of engine coolant, generator or alternator output level, actuation or operation of anti-skid mechanism, air pressure in truck air tanks, headlamp selection (whether high or low beam), or parking brake engagement.

The truck industry has, heretofore, employed one or more of such indicator lamp assemblies to thereby create, upon energization thereof, a visual signal to the operator that a particular parameter is experiencing less than satisfactory conditions thereby enabling the operator or driver to take corrective action which, in fact, may require the immediate shut-down of the engine.

Usually a plurality of such indicator lamp assemblies are employed and mounted on the vehicular dash or instrument panel. Each of such indicator lamp assemblies comprises a lens portion which may be threadably or otherwise secured to the remaining portion of the lamp assembly in a manner whereby the lens protrudes some distance from the plane of the instrument panel. This, in turn, has caused problems to arise. That is, for example, because of the protruding nature of such lenses, they, to some degree, form a safety hazard if, during a vehicular collision or the like, struck against by the vehicle operator. Also, because the indicator light assemblies are often located close to each other, the light eminating from one energized assembly sometimes causes the lens of an adjoining light assembly to appear as if it, too, is lit. The same applies to the various lenses when they are struck by rays of sunlight or rays of light reflected as from components within the passenger compartment of the vehicle. Such apparent but not actual energization of the indicator lamp assemblies conveys incorrect and misleading information to the vehicle operator.

Accordingly, the invention as herein disclosed and claimed is directed primarily to the solution of the foregoing as well as related and attendant problems.

SUMMARY OF THE INVENTION

According to one aspect of the invention, a lens shroud or shield has a generally tubular body with a continuous wall which, in turn, has an external wall surface and an internal wall surface, and the internal wall surface is provided with a generally textured portion for enhancing the detachable securing of the lens shroud body as to a cooperating lens.

Various general and specific objects and advantages of the invention will become apparent when reference is made to the following detailed description considered in conjunction with the accompanying drawings.

BRIEF DESCRIPTION OF THE DRAWINGS

In the drawings wherein for purposes of clarity certain details and/or elements may be omitted from one or more views.

DETAILED DESCRIPTION OF THE PREFERRED EMBODIMENTS

Figure 1:
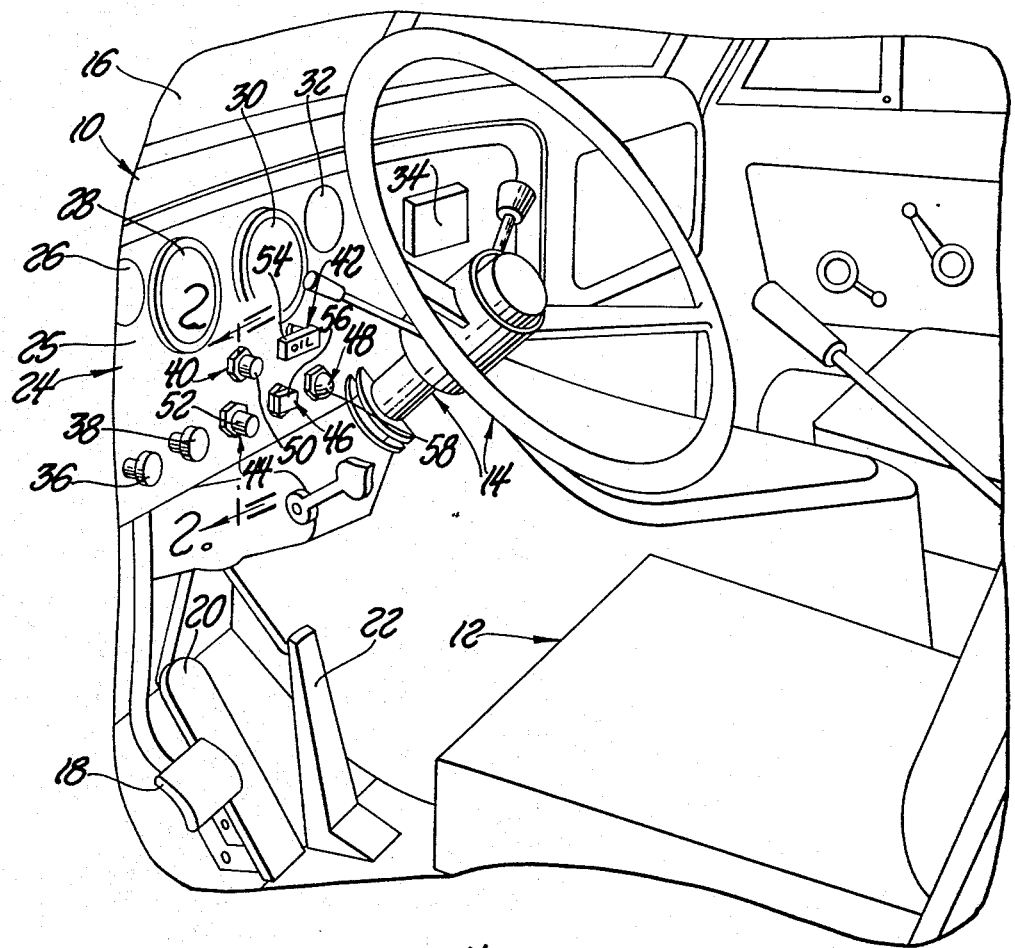
FIG. 1 is a fragmentary perspective view of an interior of a truck cab having an instrument panel employing, typically, indicator lamp assemblies to which the invention may be applied.

Referring now in greater detail to the drawings, FIG. 1 illustrates the interior of a truck cab 10 as being comprised of, for example: a driver's or operator's seat assembly 12; steering wheel and column assembly 14; windshield 16; operator's foot actuated levers and pedals 18, 20 and 22; instrument panel assembly 24 comprising a panel-like support 25 and an array of gauges 26, 28, 30, 32 and 34; controls 36 and 38; and a plurality of indicator lamp assemblies 40, 42, 44, 46 and 48 with any of which the lens shield means of the invention may be employed. The lens shield of the invention is not shown in FIG. 1 because such would obscure the general configurations of the various lenses 50, 52, 54, 56 and 58 which comprise some of the configurations with which the lens shield means of the invention may be employed. For example, lenses 50 and 52 are each of generally cylindrical configuration with lens 50 being relatively shorter in axial length; lens 54 is of a generally rectangular (as possibly a right parallelepiped) configuration; lens 56 may, in front projected view be a square; while lens 58 may have a curvilinear, spherical or bulbous-like projecting outer surface.

Figure 2:
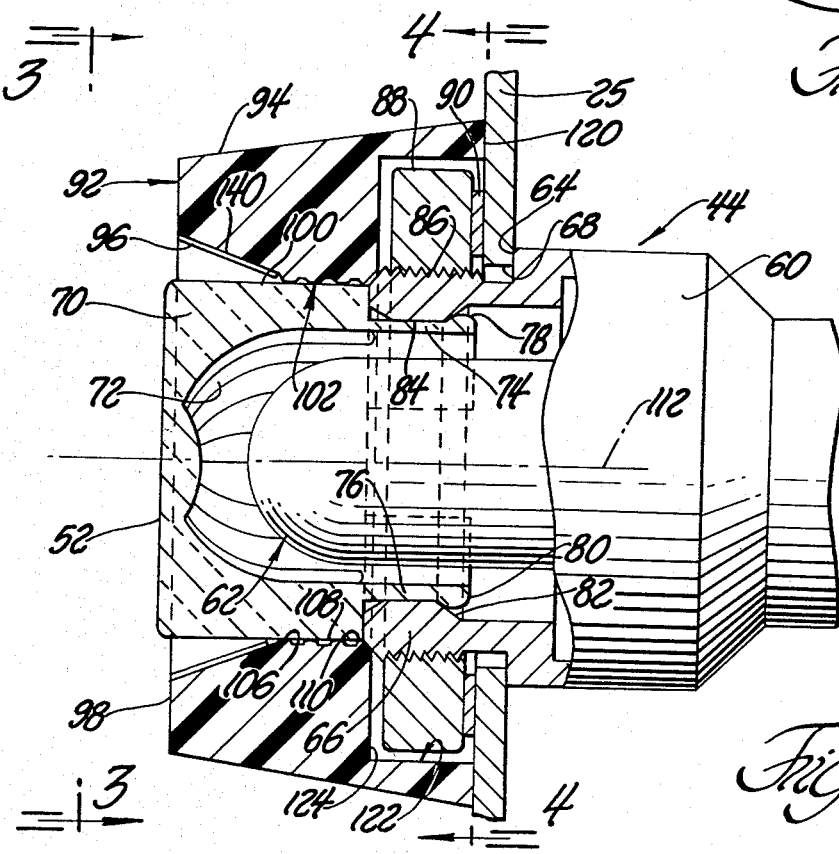
FIG. 2 is an enlarged fragmentary cross-sectional view taken generally on the plane of line 2—2 of FIG. 1, and looking in the direction of the arrows, with a lens shield of the invention.
Figure 3:
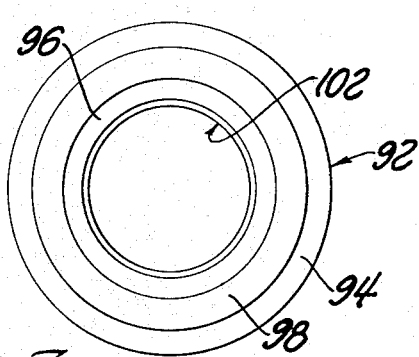
FIGS. 3 and 4 are elevational views, in reduced scale, taken respectively on the planes of lines 3—3 and 4—4 of FIG. 2 and looking in the direction of the arrows.

Referring to FIG. 2, the indicator lamp assembly 44, which may be of any desired type or configuration, is shown as comprising lamp housing means 60 which, in turn, supports electrical bulb means 62 which, as is for example well known in the art, is operatively connected to any suitable related electrical circuitry (not shown). Housing means 60 is provided with shoulder or abutment means 64, which is operatively engaged with one side of panel or support means 25, and a necked-down or diametrically reduced tubular extension 66 which passes through an aperture 68 in the mounting means 25. The lens 52, as shown in both FIGS. 1 and 2, has a main body 70 of generally cylindrical configuration which may include recess or cavity means 72 for accommodating the bulb 62. A pair of relatively resiliently deflectable leg portions 74 and 76 carried by lens body 70 are respectively provided with radially outwardly directed bead-like portions 78 and 80 which cooperate with, for example, an annular ramp surface 82 of a radially inwardly directed retainer portion 84, carried by the housing extension 66, to retain lens 52 assembled onto the housing means 60. As can be seen, the housing extension 66 is externally threaded as at 86 to enable threadable coaction with a retainer nut 88 which, as through washer means 90, serves to draw the shoulder abutment means 64 of housing 60 tightly into locked engagement with mounting means 25.

The lens shield means 92 is illustrated as being a body of generally tubular configuration with an outer wall surface 94 which, for example, may be generally conical as to have its widest diameter at its base adjacent the support means 25 and its narrowest diameter in the vicinity of the projecting end of lens 52. (When viewed in elevation, such a contemplated configuration of the lens shield means 92 would appear as a truncated right circular cone.) The inner surface means of lens shield means 92 is illustrated as being comprised of various surface portions the first of which is an inner conical surface 96 which has its widest most diameter breaking or opening into forward end surface 98 while its narrowest diameter at least closely approaches the outer surface 100 of lens 52 as to generally meet with a contoured or textured gripping surface means 102.

Figure 5:
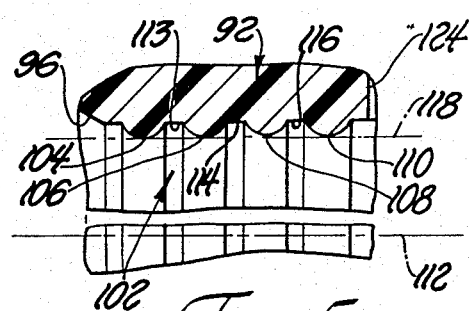
FIG. 5 is an enlarged view of a fragmentary portion of FIG. 2.
Figure 6:
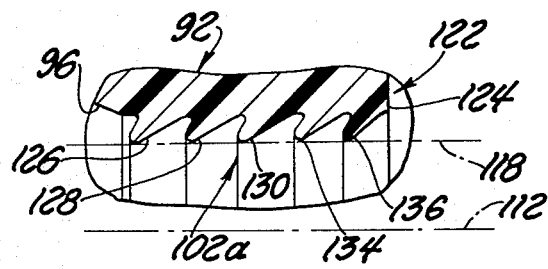
FIG. 6 is a view similar to that of FIG. 5 and illustrating a modification of the portion shown in FIG. 5.

As can be better seen in the enlarged fragmentary view of FIG. 5, the gripping or retainer surface means 102 is shown as comprising a plurality of axially spaced annular protuberances 104, 106, 108 and 110 formed as to be extending or directed generally radially inwardly toward the axis 112. In one successful embodiment of the invention, the annular protuberances 104, 106, 108 and 110 were axially spaced from each other as by discontinuous-like flat annular land portions 113, 114 and 116. As shown in FIG. 2, the contour of the protuberances or gripping portions 104, 106, 108 and 110, when viewed in axial cross-section, is that of a circular arc. However, it should be apparent that other configurations are possible and contemplated as coming within the scope of the invention; one of such other configurations is illustrated in FIG. 6 to be hereinafter described in detail. Although the lens shield means of the invention may be formed of any suitable material, in its preferred embodiment, the invention is preferably formed of rubber, high temperature silicone compound rubber, or polyvinyl chloride with a hardness in the order of a 76 Durometer rating. Further, as generally illustrated in FIG. 5, in the preferred embodiment, the protuberances 104, 106, 108 and 110 extend radially inwardly as to all be tangent as to a line 118 (for a cylindrical trace) which is generally parallel to centerline or axis 112. However, it is also contemplated that such a trace 118 may, of course, be conically inclined as to result in, for example, the forward most portion of the gripping means 102, as, for example, annular protuberance 104 having the relatively smallest inner diameter.

The fragmentary portion shown in FIG. 5 illustrates the gripping means 102 in its free state while as generally depicted in FIG. 2 the same means 102 is illustrated in a somewhat compressed state caused by the lens shield means 92 being pushed onto lens 52 and thereby resulting in an interference fit between the means 102 and outer surface 100 of lens 92 causing a resilient deformation of the protuberances comprising means 102.

Figure 4:
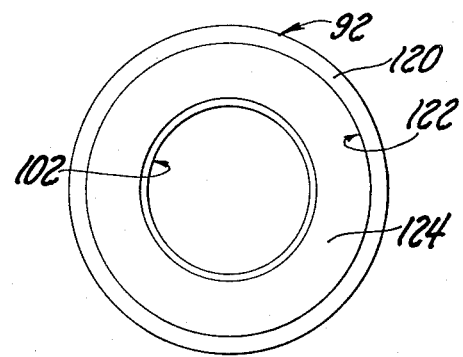

Referring to FIGS. 2 and 4, the rearward or base end 120 of lens shield means 92 is provided with a generally cylindrical recess 122 formed therein. As generally depicted, the radially extending annular surface 124 is preferably axially located as to be in a plane in at least close proximity to the rearward end of the gripping means 102. As shown in FIG. 2, the recess 122 is effective for accommodating therein the nut 88 and washer or spacer means 90 as to thereby provide an aesthetic outer apppearance to the light assembly 44 with which the lens shield means is associated.

FIG. 6, a view similar to that of FIG. 5, illustrates one modified configuration of gripping means 102a functionally equivalent to gripping means 102. In FIG. 6 the gripping or retainer surface means 102a is illustrated as comprising a plurality of generally axially spaced annular protuberances 126, 128, 130, 134 and 136 formed as to be extending or directed generally radially inwardly toward the axis 112. The contour of the protuberances or gripping means 126, 128, 130, 134 and 136, when viewed in axial cross-section, is that of a plurality of generally finger-like portions tapering as to be narrower in cross-sectional thickness the closer such finger-like portions approach axis 112. As generally illustrated, the free ends of protuberances or grippers 126, 128, 130, 134 and 136 may be tangent to a line 118 (or a cylindrical trace) which is generally parallel to centerline 112. However, it is also contemplated that such a trace 118 may, of course, be inclined or otherwise non-parallel to centerline 112.

Further, it is contemplated that surface 96 may be either formed to be very smooth, polished or even provided with a reflecting coating 140 as to thereby aid in re-directing generally forwardly such light rays as travel generally radially outwardly from the lens 50. In effect, this causes the viewer to see what would appear to be a larger light when bulb 62 is energized. This effect is present even when surface 96 is not polished or coated with reflecting material; however, such polishing and/or reflectorizing further enhances such effect.

Figure 7:
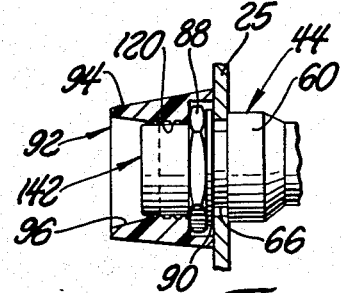
FIG. 7 is a view similar to that of FIG. 2, in reduced scale, and illustrating the use of a shield of the invention in combination with a relatively short lens.

FIG. 7 illustrates how, for example, a standard size of lens shield means 92 may be similarly employed in combination with a relatively short lens 142 much like the lens 50 depicted in FIG. 1.

Figure 8:
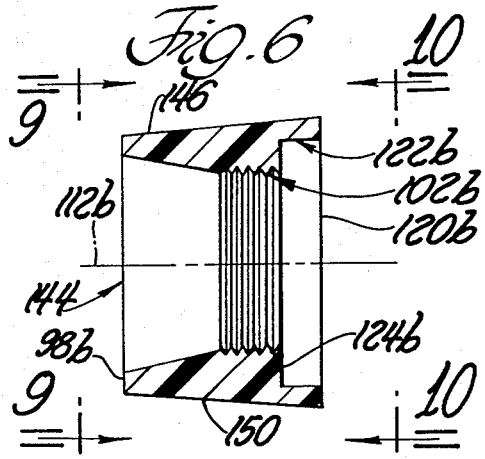
FIG. 8 is an axial cross-sectional view of another embodiment of the invention.
Figure 9:
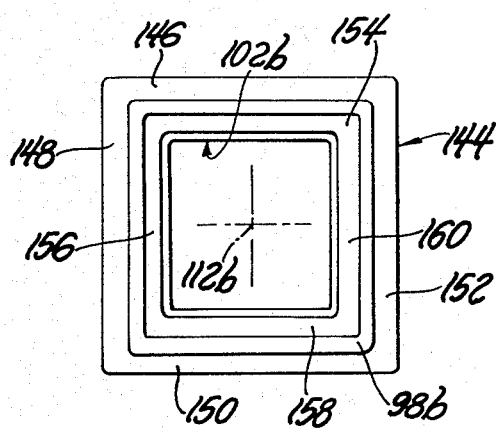
FIGS. 9 and 10 are elevational views taken respectively on the planes of lines 9—9 and 10—10 of FIG. 8 and looking in the direction of the arrows.
Figure 10:
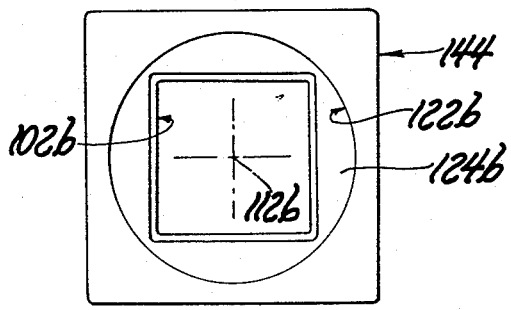

FIG. 8, 9 and 10 illustrate another embodiment of the invention which is not of cylindrical configuration but rather square-like. Elements in FIGS. 8, 9 and 10 which are like or functionally similar to those of the preceding Figures are identified with like reference numbers provided with a suffix "b". As can be seen, the outer wall surfaces 146, 148, 150 and 152 are planar and inclined toward the axis 112b. Similarly, but inclined in the opposite direction, are inner wall surfaces 154, 156, 158 and 160 which also are planar.

Figure 11:
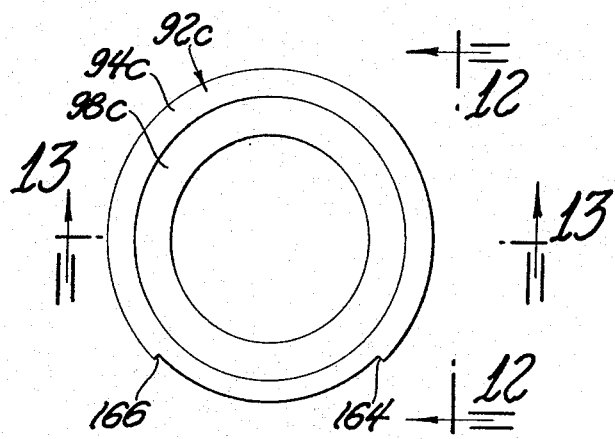
FIG. 11 is an end view of a further embodiment of the invention.
Figure 12:
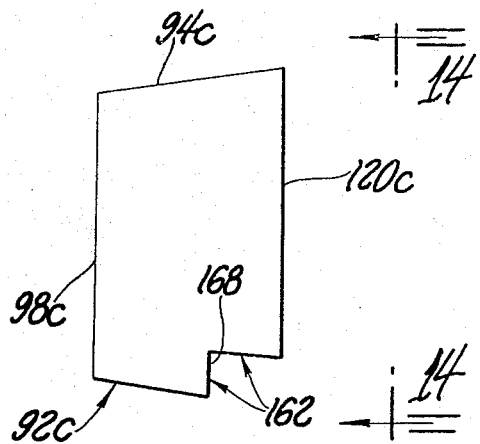
FIGS. 12 and 13 are respectively cross-sectional and elevational views respectively taken on the planes of lines 12—12 and 13—13 of FIG. 11 and looking in the direction of the arrows.
Figure 13:
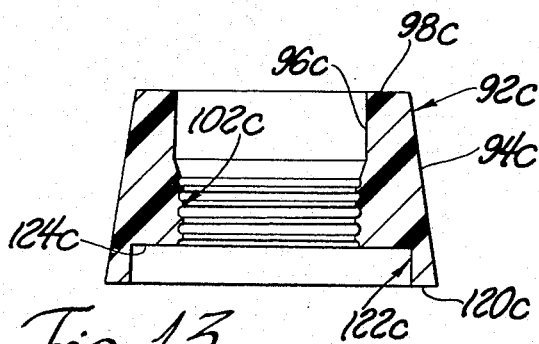
Figure 14:
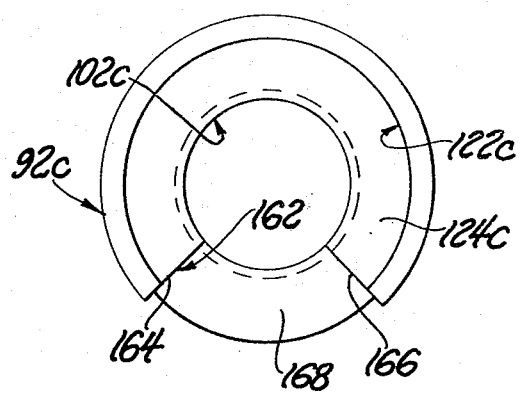
FIG. 14 is an end elevational view taken on the plane of line 14–14 of FIG. 12 and looking in the direction of the arrows.

FIGS. 11, 12, 13 and 14 illustrate other modifications of the invention. Elements in FIGS. 11, 12, 13 and 14 which are like or similar to those of FIG. 2–7 are identified with like reference numbers provided with a suffix "c". Further, in the embodiment of FIG. 13, it can be seen that the inner wall surface 96c is generally tubular and not inclined as wall surface 96 of FIG. 2. Also, as shown in FIGS. 11, 12 and 14, the invention may be further modified by forming a slot 162 therethrough in any radial direction selected by the placement of the shield means relative to its associated lens. As shown in FIG. 14 such a slot or light passage 162 may be formed as a sector with radially directed walls or surfaces 164 and 166 which meet an axial wall 168.

Figure 15:
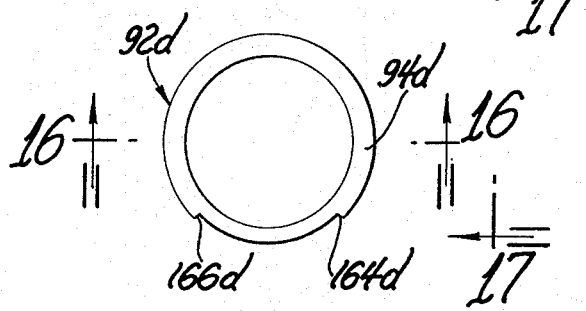
FIG. 15 is an end view of yet another embodiment of the invention.
Figure 17:
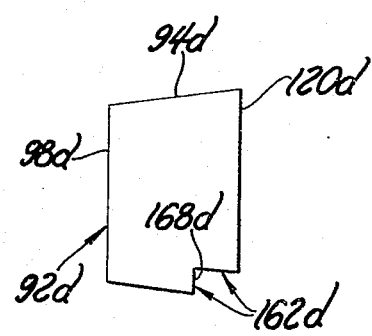
FIGS. 16 and 17 are respectively cross-sectional and elevational views respectively taken on the planes of lines 16—16 and 17—17 of FIG. 15 and looking in the direction of the arrows.
Figure 16:
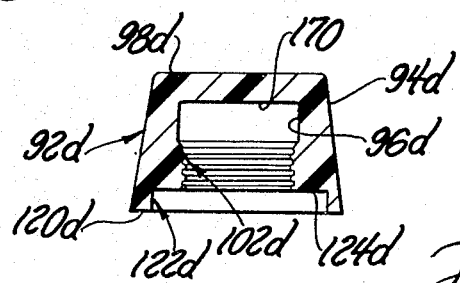

FIGS. 15, 16 and 17 illustrate a further modification of the invention. Elements in FIGS. 15, 16 and 17 which are like or functionally similar to those of FIGS. 11–14 are identified with like reference numbers provided with a suffix "d". In comparing the embodiments of FIGS. 11–14 to FIGS. 15–17, it can be seen that in, for example, FIG. 16, the forward end 98d extends across the entire front as by a forward wall portion 170 into which inner wall surface 96d terminates at its forwardmost end. Again, the inner surfaces may be provided with a reflective coating as to enhance the amount of light directed through the slot 162d while the forward closed end of the shield means 92d prevents any light from being emitted therefrom.

It should be apparent that the invention, because of the relatively resiliently deflectable gripping means enables the use of such shield means in combination with various forms of light indicator assemblies regardless of the configuration of the associated lens and regardless of the manner in which such lens is retained by or connected to the remaining portion of the light indicator assembly. The fact that such a textured or otherwise contoured resiliently deflectable gripping means is provided enables such gripping or retainer means to engage the outer surface or edge of any associated lens even when such a lens is a relatively short spherical sector in configuration. Further, the assembly and disassembly of a lens shield, according to the invention, to and from a related lens requires no disassembly of the associated lens or related light indicator assembly as is often the case with prior art apparatus providing a light shielding function.

The invention contemplates further modifications not specifically shown and it should be apparent that the invention may be practiced without the use of recess means as at, for example, 122 of FIG. 2. However, the use of such a recess means 122 is desirable in that it permits an increased degree of resilient deflection when the shield means is being pushed onto the associated lens and thereby providing for the assured gripping of the gripping means 102 with any available outer edge or surface of the lens.

Although only one preferred embodiment and a select number of modifications of the invention have been disclosed and described, it is apparent that other embodiments and modifications of the invention are possible within the scope of the appended claims.

We claim:

1. Lens shield means, comprising shield body means, said body means having a medial axis and comprising a relatively forward end, a relatively rearward end, outer wall surface means extending from said forward end to said rearward end, said shield body means being effective to be detachably secured to and detached from an associated lens by axially pushing said shield body means onto and off of said associated lens, and inner wall surface means formed in said body means generally about said axis, said inner wall surface means comprising relatively resiliently deflectable gripping means effective for directly operatively engaging said associated lens, said resiliently deflectable gripping means being effective to undergo resilient deflection and deformation against said associated lens as said shield body means is pushed onto said associated lens, said resiliently deflected and deformed gripping means exhibiting a resilient gripping force directed generally inwardly toward said medial axis and directly against said associated lens as to thereby maintain said shield body means detachably secured directly to said associated lens, said outer wall surface means of said shield body means having an outer elevational configuration generally that of a truncated right circular cone, said outer wall surface means tapering as to have its narrower diameter at said relatively forward end and its wider diameter at said relatively rearward end, said inner wall surface means comprises a conical surface portion tapering as to have its wider diameter at said relatively forward end and its narrower end directed toward said rearward end, and said shield body means being molded of relatively resilient material.

2. Lens shield means according to claim 1 wherein said resiliently deflectable gripping means defines an inner axially directed passage having an effective diameter, wherein said resiliently deflectable gripping means is formed as to be situated generally axially between said narrower end of said conical surface and said rearward end, and wherein the diameter of said narrower end of said conical surface is of a magnitude at least equal to the magnitude of said effective diameter of said axially directed passage.

3. Lens shield means according to claim 1 wherein said resiliently deflectable gripping means defines an inner axially directed clearance passage, and further comprising recess means formed in said body means in said relatively rearward end, said recess means comprising recess surface means formed in an inner portion of said body means and extending as to be disposed generally outwardly about said clearance passage, said recess means effectively defining clearance means for accepting protruding structure associated with said associated lens.

4. Lens shield means according to claim 3 wherein said recess surface means comprises an annular shoulder-like recess.

5. Lens shield means, comprising shield body means, said body means having a medial axis and comprising a relatively forward end, a relatively rearward end, outer wall surface means extending from said forward end to said rearward end, said shield body means being effective to be detachably secured to and detached from an associated lens by axially pushing said shield body means onto and off said associated lens, and inner wall surface means formed in said body means generally about said axis, said inner wall surface means comprising relatively resiliently deflectable gripping means effective for directly operatively engaging said associated lens, said resiliently deflectable gripping means being effective to undergo resilient deflection and deformation against said associated lens as said shield body means is pushed onto said associated lens, said resiliently deflected and deformed gripping means exhibiting a resilient gripping force directed generally inwardly toward said medial axis and directly against said associated lens as to thereby maintain said shield body means detachably secured directly to said associated lens, said outer wall surface means comprising a plurality of joined generally flat surfaces, said flat surfaces being arranged with respect to each other and inclined as to cause said shield body means to have an outer elevational configuration generally that of a truncated pyramid with the wider portion thereof being at said relatively rearward end and the narrower portion thereof being at said relatively forward end.

6. Lens shield means according to claim 5 wherein said inner wall surface means comprises a plurality of joined generally flat second surfaces, wherein said flat second surfaces are arranged with respect to each other and inclined as to have the widest portion thereof at said relatively forward end and the narrowest portion thereof directed toward said relatively rearward end.

7. Lens shield means, comprising shield body means, said body means having a medial axis and comprising a relatively forward end, a relatively rearward end, outer wall surface means extending from said end to said rearward end, said shield body means being effective to be detachably secured to and detached from an associated lens by axially pushing said shield body means onto and off of said associated lens, inner wall surface means formed in said body means generally about said axis, said inner wall surface means comprising relatively resiliently deflectable gripping means effective for directly operatively engaging said associated lens, said resiliently deflectable gripping means being effective to undergo resilient deflection and deformation against said associated lens as said shield body means is pushed onto said associated lens, said resiliently deflected and deformed gripping means exhibiting a resilient gripping force directed generally inwardly toward said medial axis and directly against said associated lens as to thereby maintain said shield body means detachably secured directly to said associated lens, and inner recess means formed in said body means in said relatively rearward end, said recess means comprising a stepped surface extending about said medial axis, said stepped surface serving as an axial terminus for said inner wall surface means.

8. Lens shield means, comprising shield body means, said body means having a medial axis and comprising a relatively forward end, a relatively rearward end, outer wall surface means extending from said forward end to said rearward end, said shield body means being effective to be detachably secured to and detached from an associated lens by axially pushing said shield body means onto and off of said associated lens, inner wall surface means formed in said body means generally about said axis, said inner wall surface means comprising relatively resiliently deflectable gripping means effective for directly operatively engaging said associated lens, said resiliently deflectable gripping means being effective to undergo resilient deflection and deformation against said associated lens as said shield body means is pushed onto said associated lens, said resiliently deflected and deformed gripping means exhibiting a resilient gripping force directed generally inwardly toward said medial axis and directly against said associated lens as to thereby maintain said shield body means detachably secured directly to said associated lens, and a transverse wall portion integrally formed with said body means and exending totally across said relatively forward end, said inner wall surface means terminating in and comprising an inner surface of said transverse wall portion.

9. Lens shield means according to claim 8 wherein said resiliently deflectable gripping means is situated as to be axially spaced from said inner surface of said transverse wall portion.

10. Lens shield means according to claim 5 wherein said inner wall surface means comprises a plurality of joined generally flat second surfaces, wherein said flat second surfaces are arranged with respect to each other and inclined with respect to said medial axis as to have a passage defined therebetween which has the relatively widest portion thereof at said relatively forward end and the relatively narrowest portion thereof directed toward said relatively rearward end, and further comprising reflective coating material applied to said flat second surfaces.

11. Lens shield means, comprising shield body means, said body means having a medial axis and comprising a relatively forward end, a relatively rearward end, outer wall surface means extending from said forward end to said rearward end, said shield body means being effective to be detachably secured to and detached from an associated lens by axially pushing said shield body means onto and off of said associated lens, inner wall surface means formed in said body means generally about said axis, said inner wall surface means comprising relatively resiliently deflectable gripping means effective for directly operatively engaging said associated lens, said resiliently deflectable gripping means being effective to undergo resilient deflection and deformation against said associated lens as said shield body means is pushed onto said associated lens, said resiliently deflected and deformed gripping means exhibiting a resilient gripping force directed generally inwardly toward said medial axis and directly against said associated lens as to thereby maintain said shield body means detachably secured directly to said associated lens, and passage means formed radially through a portion of said body means as to thereby define a line-of-sight path from a point radially within said inner wall surface means to points radially outwardly of said outer wall surface means, said passage means being axially situated as to intersect with and form an aperture in a portion of said resiliently deflectable gripping means.

12. Lens shield means, comprising shield body means, said body means having a medial axis and comprising a relatively forward end, a relatively rearward end, outer wall surface means extending from said forward end to said rearward end, said shield body means being effective to be detachably secured to and detached from an associated lens by axially pushing said shield body means onto and off of said associated lens, inner wall surface means formed in said body means generally about said axis, said inner wall surface means comprising relatively resiliently deflectable gripping means effective for directly operatively engaging said associated lens, said resiliently deflectable gripping means being effective to undergo resilient deflection and deformation against said associated lens as said shield body means is pushed onto said associated lens, said resiliently deflected and deformed gripping means exhibiting a resilient gripping force directed generally inwardly toward said medial axis and directly against said associated lens as to thereby maintain said shield body means detachably secured directly to said associated lens, and passage means formed radially through a portion of said body means, said passage means extending generally radially of said axis as to intersect and extend from said inner wall surface means to and intersect said outer wall surface means, said passage means having a first axial end surface axially situated as to intersect at least a portion of said resiliently deflectable gripping means, and wherein a second axial end of said passage means intersects with and forms an opening in said relatively rearward end of said body means.

13. Lens shield means, comprising shield body means, said body means having a medial axis and comprising a relatively forward end, a relatively rearward end, outer wall surface means extending from said forward end to said rearward end, said shield body means being effective to be detachably secured to and detached from an associated lens by axially pushing said shield body means onto and off of said associated lens, inner wall surface means formed in said body means generally about said axis, said inner wall surface means comprising relatively resiliently deflectable gripping means effective for directly operatively engaging said associated lens, said resiliently deflectable gripping means being effective to undergo resilient deflection and deformation against said associated lens as said shield body means is pushed onto said associated lens, said resiliently deflected and deformed gripping means exhibiting a resilient gripping force directed generally inwardly toward said medial axis and directly against said associated lens as to thereby maintain said shield body means detachably secured directly to said associated lens, and recess means formed in said body means in said relatively rearward end, said recess means comprising recess surface means extending about said medial axis and serving generally as an axial terminus for said inner wall surface means, and line-of-sight passage means formed through a portion of said body means, said line-of-sight passage means being generally radially directed with respect to said medial axis, said line-of-sight passage means comprising a second recess-like portion extending axially along said medial axis as to extend through said relatively rearward end and said recess surface means as well as at least a portion of said resiliently deflectable gripping means, said line-of-sight passage enabling light eminating from said associated lens to be selectively angularly directed about said medial axis depending upon the relative angular position which said body means has been pushed onto said associated lens.

14. Lens shield means, comprising shield body means, said body means having a medial axis and comprising a relatively forward end, a relatively rearward end, outer wall surface means extending from said forward end to said rearward end, said shield body means being effective to be detachably secured to and detached from an associated lens by axially pushing said shield body means onto and off of said associated lens, inner wall surface means formed in said body means generally about said axis, said inner wall surface means comprising relatively resiliently deflectable gripping means effective for directly operatively engaging said associated lens, said resiliently deflectable gripping means being effective to undergo resilient deflection and deformation against said associated lens as said shield body means is pushed onto said associated lens, said resiliently deflected and deformed gripping means exhibiting a resilient gripping force directed generally inwardly toward said medial axis and directly against said associated lens as to thereby maintain said shield body means detachably secured directly to said associated lens, said gripping means comprising a plurality of relatively resiliently deflectable protuberances, said protuberances being integrally formed with said body means and arranged as to be extending generally toward said medial axis, said outer wall surface means of said shield body means having an outer elevational configuration generally that of a truncated right circular cone, wherein said outer wall surface means tapers as to have its narrower diameter at said relatively forward end and its wider diameter at said relatively rearward end, wherein said inner wall surface means comprises an inner conical surface portion tapering as to have its wider diameter at said relatively forward end and its relatively narrower diameter end directed toward said rearward end, wherein said shield body means is molded of relatively resilient material, and reflective coating material applied to said inner conical surface portion.

15. Lens shield means, comprising shield body means, said body means having a medial axis and comprising a relatively forward end, a relatively rearward end, outer wall surface means extending from said forward end to said rearward end, said shield body means being effective to be detachably secured to and detached from an associated lens by axially pushing said shield body means onto and off of said associated lens, and inner wall surface means formed in said body means generally about said axis, said inner wall surface means comprising relatively resiliently deflectable gripping means effective for directly operatively engaging said associated lens, said resiliently deflectable gripping means being effective to undergo resilient deflection and deformation against said associated lens as said shield body means is pushed onto said associated lens, said resiliently deflected and deformed gripping means exhibiting a resilient gripping force directed generally inwardly toward said medial axis and directly against said associated lens as to thereby maintain said shield body means detachably secured directly to said associated lens, said gripping means comprising a plurality of relatively resiliently deflectable protuberances, said protuberances being integrally formed with said body means and arranged as to be extending generally toward said medial axis, said resiliently deflectable protuberances when viewed in a direction along said medial axis define a passage of generally rectilinear cross-sectional configuration.

16. Lens shield means according to claim 15 wherein said rectilinear configuration comprises a square.

17. Lens shield means, comprising shield body means, said body means having a medial axis and comprising a relatively forward end, a relatively rearward end, outer wall surface means extending from said forward end to said rearward end, said shield body means being effective to be detachably secured to and detached from an associated lens by axially pushing said shield body means onto and off of said associated lens, and inner wall surface means formed in said body means generally about said axis, said inner wall surface means comprising relatively resiliently deflectable gripping means effective for directly operatively engaging said associated lens, said resiliently deflectable gripping means being effective to undergo resilient deflection and deformation against said associated lens as said shield body means is pushed onto said associated lens, said resiliently deflected and deformed gripping means exhibiting a resilient gripping force directed generally inwardly toward said medial axis and directly against said associated lens as to thereby maintain said shield body means detachably secured directly to said associated lens, said gripping means comprising a plurality of relatively resiliently deflectable protuberances, said protuberances being integrally formed with said body means and arranged as to be extending generally toward said medial axis, said resiliently deflectable protuberances when viewed in a direction along said medial axis define a passage of generally circular cross-sectional configuration.

* * * * *

UNITED STATES PATENT OFFICE
CERTIFICATE OF CORRECTION

Patent No. 4,126,375          Dated November 21, 1978

Inventor(s) BULL, DAVID W & RAUTIOLA, NORMAN A.

It is certified that error appears in the above-identified patent and that said Letters Patent are hereby corrected as shown below:

In the "Abstract", last line thereof, after "a" and before "lens" delete "coating" and substitute therefor
--- coacting ---.

Claim 7, line 4 thereof, after "from said" and before "end to said" insert --- forward ---.

Signed and Sealed this

First Day of April 1980

[SEAL]

Attest:

SIDNEY A. DIAMOND

Attesting Officer       Commissioner of Patents and Trademarks